United States Patent [19]
Mohseni

[11] Patent Number: 5,910,179
[45] Date of Patent: Jun. 8, 1999

[54] METHOD AND SYSTEM FOR TRANSMITTING DATA WITHIN A TREE STRUCTURE AND RECEIVING A CONFIRMATION OR STATUS THEREFOR

[75] Inventor: Ali Akbar Mohseni, Norwalk, Conn.

[73] Assignee: Pitney Bowes Inc., Stamford, Conn.

[21] Appl. No.: 08/736,861

[22] Filed: Oct. 25, 1996

[51] Int. Cl.$^6$ .................................................. H04L 12/44
[52] U.S. Cl. ...................... 709/252; 370/408; 340/825.02
[58] Field of Search ....................... 340/825.02; 370/407, 370/408; 364/229.41, 940.92, 240.9; 395/200.82

[56] References Cited

U.S. PATENT DOCUMENTS

| | | | |
|---|---|---|---|
| 4,122,532 | 10/1978 | Dlugos et al. ........................... | 364/900 |
| 4,866,668 | 9/1989 | Edmonds et al. ....................... | 364/900 |
| 5,117,354 | 5/1992 | Long et al. .............................. | 364/401 |
| 5,146,403 | 9/1992 | Goodman ................................ | 364/401 |
| 5,202,914 | 4/1993 | Kim et al. ................................ | 379/97 |
| 5,222,018 | 6/1993 | Sharpe et al. ........................... | 364/406 |
| 5,309,433 | 5/1994 | Cidon et al. ............................. | 370/60 |
| 5,331,637 | 7/1994 | Francis et al. ........................... | 370/54 |
| 5,355,371 | 10/1994 | Auerbach et al. ....................... | 370/60 |
| 5,406,036 | 4/1995 | Haug ...................................... | 177/25.15 |
| 5,455,865 | 10/1995 | Perlman .................................. | 380/49 |
| 5,541,927 | 7/1996 | Kristol et al. ........................... | 370/94.2 |
| 5,670,222 | 9/1997 | Chen et al. ............................. | 370/338 |
| 5,740,170 | 4/1998 | Andou et al. ........................... | 370/390 |

*Primary Examiner*—Lance Leonard Barry, Esq.
*Attorney, Agent, or Firm*—Melvin J. Scolnick; Charles R. Malandra

[57] ABSTRACT

Communication of information from a central station, acting as a source node, to a plurality of destination nodes at customer sites is implemented by using various of the destination nodes as intermediary transfer nodes, which receive information from the central station or from other predecessor intermediary nodes and which transfer the information to other intermediary transfer nodes or to final destination nodes. Communication links are established between specified ones of the destination nodes to provide a grouping of nodes in which each node transfers information to no more than a predetermined number of nodes, resulting in a top-down tree structure in which the central station is a top source node of the tree. The destination nodes provide confirmation signals confirming receipt of the transmitted information to the nodes in the immediately preceding level of the tree structure, along the same communication links used to transmit the information. The confirmation signals are received from each of the nodes to which the information was successfully transmitted, thus identifying those nodes in the tree structure which failed to receive data, as well as the nodes at the lowest tree level with confirmed receipt of the information.

8 Claims, 4 Drawing Sheets

METHOD AND SYSTEM FOR TRANSMITTING DATA WITHIN A TREE STRUCTURE AND RECEIVING A CONFIRMATION OR STATUS THEREFOR

FIELD OF THE INVENTION

This invention relates generally to an improvement in communication between a source device and a large number of destination devices which are connected in a communication network, particularly where the communication downloads and/or uploads updating information to and/or from the interconnected devices. The invention more specifically relates to systems including a number of devices distributed throughout a customer base, such as shipping systems, mailing systems, and the like, and still more particularly to postage meters operating in combination with a remote central facility which provides updates for dynamic postal information stored in the devices, including postal rates, zip codes, shipping addresses and the like.

BACKGROUND OF THE INVENTION

Known communication systems, of the type including postal shipping systems and postage meters, have a distributed customer base which includes a large number of devices at various customer sites. In such systems, it is necessary at various times to update information stored in some or all of the devices at some or all of the customer sites. For example, where zip codes, shipping rates, or postal rates change, all sites must be notified. On the other hand, in some environments, a change of a particular customer's address may be relevant only to some, but not all, of the other customers so that only some customer devices may require updating.

Such updating of information may be implemented by making the customer devices available to an update service managed by the communication system, such as by delivering the devices, or memory elements thereof, to a designated updating site. Alternatively, a system management representative may visit customer sites to provide the updated information. However, updating of information by delivery of devices to an updating site or by on-site visits from a customer representative is slow and expensive, and thus cannot be implemented frequently, so that devices at the customer sites may be operating with outdated information.

The prior art has addressed this problem and has provided techniques for updating devices at customer sites free of requirements for delivery of the devices to an updating site or for visits to the customer site by a customer representative. Thus, it is known in the prior art to use a central transfer station to contact remote customer systems, by modems for example, to download and upload information to and from the various customer systems, when the information is revised for example. The interconnection used in the prior art is illustrated in FIG. 1, where a central station 12 is shown as communicating with a number (e.g., fourteen) of devices 14 at various customer sites to update information stored therein.

In accordance with the configuration of the devices in FIG. 1, when postal rates change it is thus known to provide the new rates from the central transfer station to each of a plurality of customer systems, and particularly to those customer systems which include postage meters, in order to assure that the customers' meters print postage indicia of appropriate value on mail pieces of particular weight, size or dimension. When a change takes place in information which is relevant only to a subset of customer systems in the customer base, the central transfer station may provide the new information only to that subset of the set of all customer systems, but not to all such systems.

Thus, U.S. Pat. No. 4,122,532 discloses a system which updates obsolete postal rate data with new data, in which the new data are transmitted from a central data processor over phone lines directly to the remote mail processing devices.

In U.S. Pat. No. 5,222,018, there is described a system which receives shipping rate information at a shipper's premises and uploads the information to a central data processing facility, which in turn downloads the rate information to the various customers.

In U.S. Pat. No. 5,146,403, there is described a change of address system in which change of address terminals are widely distributed and in which a user provides address changes to the postal service, as well as to other users who send mail to that user.

The contents of each of the above described patents is incorporated herein by reference. In each of these systems there is provided direct transmission of data from one point to another on a one-to-one basis, which requires a transmission path to be established between the updating transfer (or transmitting) station and the customer (or receiving) station, and to be maintained during and throughout the transmission-reception (updating) operation.

However, when information is individually transmitted to a plurality of customer systems in accordance with the prior art one-to-one transmission configuration, the time required to complete an updating operation by a single transfer station grows at least linearly with the number of devices of the customer base which are being updated, thus requiring an increasingly complex transmission facility in the central transfer station and an increasing expense for implementing such an updating service.

U.S. Pat. No. 5,455,865, the contents of which are incorporated herein by reference, addresses the concept of routing information packets among nodes interconnected by links to form a network. The patent describes alternate approaches to transmitting a packet from a source node to a destination node. The packet may either be broadcast to every node on the network, so that the intended destination node will ultimately receive the packet, or may be routed directly to the destination node via a specific group of nodes connecting the source to the destination node.

In the broadcast method, a flooding technique is described, wherein each node which receives a packet of information is required to transmit the packet to each of its neighboring nodes (except the node from which the packet was received) so that, sooner or later, by one route or another, the packet arrives at its intended destination. In a single routing method for the packets, a source node assembles information indicating the relationships of the nodes and links, and identifies an entire route to a destination node for a particular information packet. Thus, a source node launches a packet to any destination node by providing a neighbor node with the packet and with destination, or routing, information. The neighbor (and each subsequent node receiving the packet) makes an independent decision as to which is the next node to which the packet should be forwarded in order to reach the specified destination node.

However, the flooding technique provides duplicate transmissions and the single routing approach continues to rely on a single connection path from a source node to each destination node, for each packet transmission, albeit using intermediate nodes and supplying routing information to the intermediate nodes. That is, the source node is required to initiate a transmission operation for each transmission to each destination node so that resources of the source node continue to be heavily utilized as the number of destination nodes grows.

Thus, the prior art imposes a heavy burden on the resources of a central station when the central station is used as a source node for communications with a large number of destination nodes. More specifically, none of the above described systems reduces the number of operations required to be carried out, and thus the time used, by a central transfer station when transferring update data to a plurality of destination nodes.

In order to reduce expenses associated with updating of devices at a large number of customer sites, as well as to permit a central station acting as a source node to continue to serve a growing number of destination nodes, it is necessary to provide a more efficient, less expensive, and quicker approach than used in the prior art to propagate information, and particularly to propagate common information, from a central transfer station to a number of customer sites.

Moreover, particularly for systems used in transmitting postal information which is used in printing value on mail pieces, it is necessary to assure a high level of accuracy when implementing a technique of more efficient and faster transmission of information from a central station to a plurality of customer sites.

Thus, there is a particular need in the prior art for an arrangement which more quickly propagates information from a central transfer station to a plurality of customer sites.

There is still a more specific need in the prior art for a method and apparatus capable of transmitting update information from a central transfer station to a large number of customer sites with reduced involvement of the central station while providing assurance to the central station that information so transmitted is accurately received, and for providing correct information in the event that an error is determined to have occurred in the transmission.

SUMMARY OF THE INVENTION

In accordance with the invention, a tree-like structure is used to transmit information from a central transfer station (transferor) to a large number of devices at a plurality of customer sites (transferees).

More specifically, in accordance with the invention the customer site devices to be updated are themselves used to update other such devices, so that a customer device which, at one level of implementation of the invention is a transferee, also functions at a succeeding level of implementation of the invention as a transferor, in order to eliminate a portion of the processing requirements imposed on the central transfer station by the transfer process for the update information.

The present invention thus improves communication between a single central transfer station and a large number of customer devices by providing method and apparatus for contacting the devices using a top-down tree structured arrangement of nodes representing the devices, in which the central station contacts only a small number of customer devices each of which then, in accordance with the tree structured arrangement, contacts a small number of other customer devices, etc. When contacting the small number of transferee customer devices, the central transfer station transfers the update information thereto and also directs the contacted transferee devices to act as transferor devices and to contact a next level of transferee devices, which then in turn act as transferors to contact still a further level of transferee devices in accordance with the tree structure, and so on.

In accordance with one aspect of the invention, transfer of data is implemented by telephone lines, using known modem technology. In one embodiment of the invention, the central transfer station transfers to all customer sites a tree structure information, including addresses, or phone numbers, identifying the devices at each level of the tree structure. At least one device at each customer site stores the tree structure information. However, the tree structure information may also be initially programmed into the various customer sites or may otherwise be provided thereto in an operation which may be independent of the central transfer station.

For such an embodiment, an updating operation is implemented by transfer of the update information from the central transfer station only to the small number of devices designated by the tree structure information as the devices at the first level of the tree structure, i.e., the initial transferee devices of the system. The update information is transferred to the initial transferees along with a command (which may be included in the update information itself) for the initial transferees to change roles and act as transferors, to transfer the information to the devices at the next level of the tree, which are designated as the transferees for the initial transferee devices.

In another embodiment, the central transfer station transfers to the small number of initial transferee devices the information to be updated, along with the tree structure information identifying the devices at the next level of the tree which must be contacted by the initial transferees when acting as transferors. The tree structure information also identifies, for devices assigned to any given level (e.g., n) of the tree structure, devices assigned to a further level (e.g., level n+1) of the tree structure which must be contacted by the devices at the given level n in the information transfer process, where n is an ordinal integer identifying the levels of the tree.

In accordance with a feature of the invention, the devices at any level n of the tree automatically contact the devices at level n+1 and transfer the update information thereto, along with at least a portion of the tree structure information providing address data which identifies devices at subsequent levels n+k, where k=2.

The invention further provides for returning confirmation information from the devices at the final level of the tree structured configuration of the system to the central transfer station through devices at preceding levels, along the same paths first used to transfer the information, thus identifying any faults or failures to the central transfer station.

The invention thus provides a system configuration in which the propagation time for update information from a central station to devices at N customer stations is substantially proportional only to the logarithm of the number of stations N, rather than being proportional to the number of stations itself. Stated mathematically, when the central station communicates with only B stations, and each transferee station similarly communicates with B stations, the invention essentially results in a reduction of the time needed to call all N customers to be a quantity proportional to $\log_2 N$ (rather than to N, as with use of a single station to call all of the N customers), while retaining reliability of data transfer by providing return data confirming a successful updating operation of the system.

Of course, the number of transferee stations need not be the same for all the devices throughout the distributed sites.

Thus, it is possible that each level of the tree structure may have a different number of transferee devices for the devices at that level. Moreover, even on the same level of the tree structure, different devices may have a different number of transferee devices. In either circumstance, it should be appreciated that the above expression ($\log_2 N$) is applicable when all Data transfers have been performed successfully and when all nodes have been actively participating. In other words, failure and interruptions (e.g. user interruptions) will increase the total transmission time.

From the foregoing, it will be appreciated that it is an object of the present invention to provide, in a communication system including a central station and a plurality of distributed customer sites, a system for controlling transfer of information from the central station to the distributed sites by using various of the distributed sites as intermediate transfer stations.

It is a further object of the invention to provide a system for reducing the amount of time necessary to propagate information from one device to a plurality of other devices distributed throughout the system by using various of the distributed sites as intermediate transfer stations and more particularly by establishing connection paths among the various distributed devices which effectively configure the system as a tree structure.

Another object of the invention is to reduce the amount of time necessary to propagate information from a central station to a plurality of distributed sites by establishing connection paths among the various distributed devices which effectively partition the system into a tree structure in which a unique path exists from the central station to each site of the system, by using various of the distributed sites as intermediate transfer stations to other sites, and to provide return confirmation information to the central station from each site via the unique path used to transfer the information thereto, in order to identify with certainty any devices which did not receive the propagated information.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

DETAILED DESCRIPTION OF THE PREFERRED EMBODIMENT

The following description is given in terms of a system operating as a shipping system having a plurality of customer stations in a distributed customer base, and in terms of updating of specific information such as zip code data and postal rate data, where a specified central transfer station transfers to the customer stations both the update information and tree configuration information to identify the various levels of the configuration to be used for the update. This description identifies the presently preferred embodiment illustrative of the invention and the best mode of implementing the same known to the inventor. However, the inventive concept may be used in other environments, and with various modifications.

That is, the transfer of updating zip code and postal rate information is only one application of the inventive concept. It should be appreciated that information other than the described zip code or address information may be so transferred. Moreover, information describing the specific grouping and communication links among the various stations used establish a tree structure for the information transfer may be stored at each of the customer stations upon installation, or may be otherwise provided independently of transmission of the same by the central station, thereby reducing the amount of time and facility utilization required of the central station to establish the tree structure and thus further enhancing the improvement attained by the invention.

Still further, the concept of the invention may be used to facilitate transfer from any of a plurality of distributed devices to any other of the distributed devices, with possible reconfiguration of the network to be best suited for each such transfer. That is, the organization and interconnection of the various stations simulating the tree structure may be variable, so that the tree structure may change from transmission to transmission, based on the information being transmitted, on distance between transmitting and receiving stations, on station operability or failure data, or on other criteria.

Figure 1:
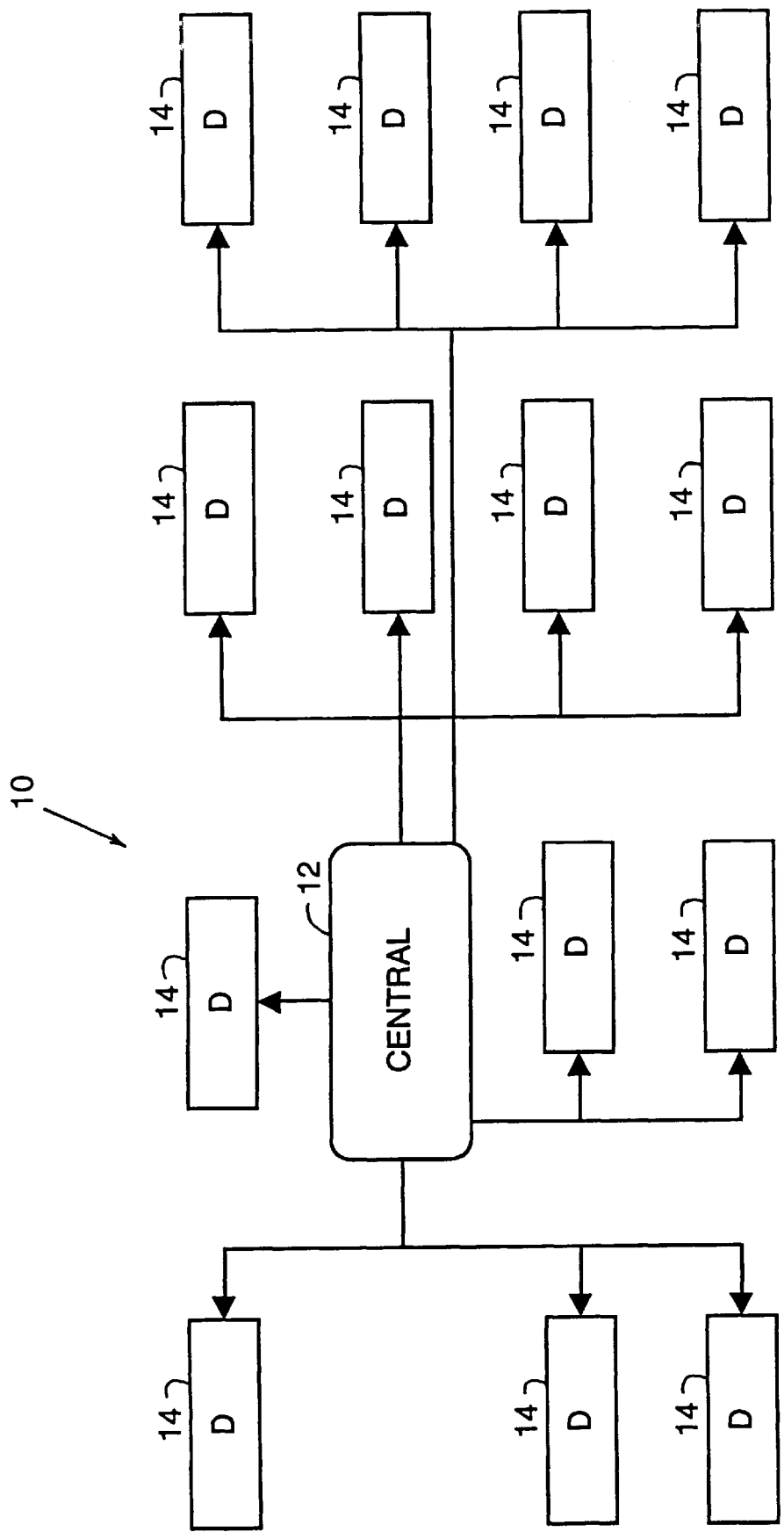
FIG. 1 shows a known configuration of communication links in a communication network wherein a central station communicates individually with a plurality of destination customer stations.

Referring now to FIG. 1, there is generally shown at 10 a communication network including central station 12, a plurality of destination stations 14 which, in the environment contemplated by the present invention, may be provided at a plurality of customer sites, and a number of communication links illustrated by the arrows in the Figure. In the prior art, when central station 12 is required to update information in one of the destination stations, the central station 12 establishes a one-to-one communication link with that destination station and updates the information therein. Thus, to update each of the destination stations, central station 12 is required to establish a link with each of the fourteen destination station 14 in FIG. 1, for example by use of a modem and telephone lines, and to repeat the process fourteen times.

Thus, it is apparent that in the prior art each destination station is separately and individually updated by the central station. Accordingly, as above noted, the central station must implement fourteen separate updating operations to update the fourteen destination stations 14 and, generally, where N destination stations are to be updated, the central station must implement N separate updating operations. The number of operations required to be performed by the central station is thus linearly proportional to the number of stations to be updated.

Figure 2:
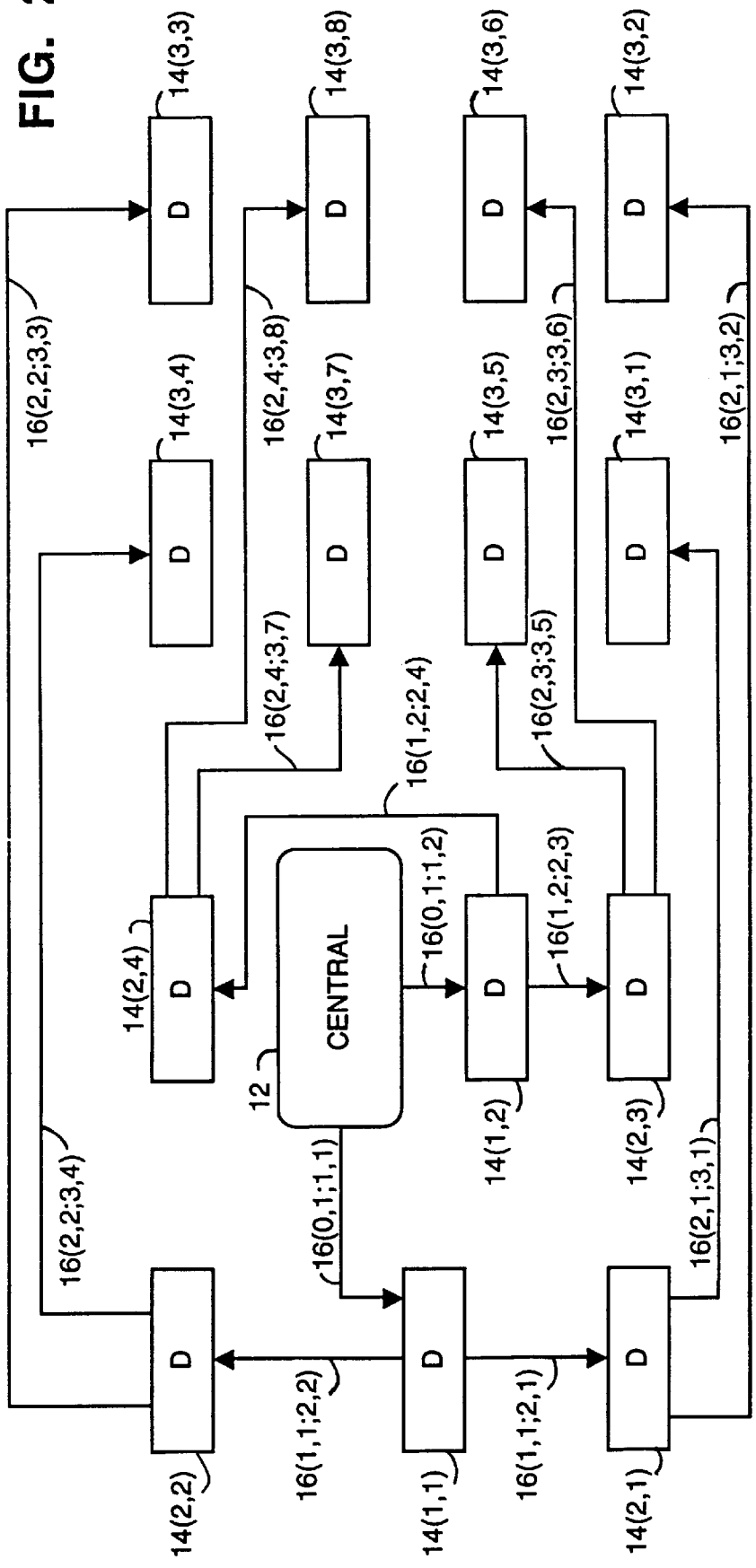
FIG. 2 shows a configuration of the communication links communication network of FIG. 1 in accordance with the invention.

FIG. 2 shows a different configuration of the communication links in the communication network of FIG. 1, which reduces the number of operations required to be performed by the central station to update the plural destination stations. As shown in FIG. 2, the various stations are grouped and interconnected in a specific manner in order to attain the efficiencies of the present invention. Specifically, each of the stations, whether central station 12 or one of the destination stations 14, is shown as communicating by specified communication links to specified other stations.

In the following description of the configuration of the communication network, a designation "14(i,j)" used in conjunction with a destination station in FIG. 2 in fact identifies that station as the $j^{th}$ destination station 14 of the $i^{th}$ group of stations, in a grouping established in accordance with the invention. Further, communication links established by the inventive configuration are designated as "16(i,j:k,l)" in FIG. 2, to identify a communication link from the $j^{th}$ node at the $i^{th}$ group of destination stations to the $l^{th}$ node of the $k^{th}$ group of destination stations.

Thus, as an example, it will be seen that the central station (designated as the first station of the $0^{th}$ group) communicates via a communication link 16(0, 1: 1, 1) with destination station 14(1, 1) and via a further communication link 16(0, 1: 1, 2) with destination station 14(1, 2). Similarly, destination station 14(2, 4) communicates via a link 16(2, 4: 3, 8) with destination station 14(3, 8) and communicates via link 16(2, 4: 3, 7) with destination station 14 (3, 7).

As will be appreciated from FIG. 2, the total number of communication links is the same as shown in FIG. 1 (i.e., fourteen) but only two of the communication links involve the central station 12. Moreover, various of the destination stations are used as intermediary source stations, or source nodes, to implement communication from central station 12 to all fourteen of the destination stations 14. For example, station 14(1, 2) is an intermediary source for information transmitted from station 12 to update destination station 14(2, 3) and 14(3, 5).

Figure 3:
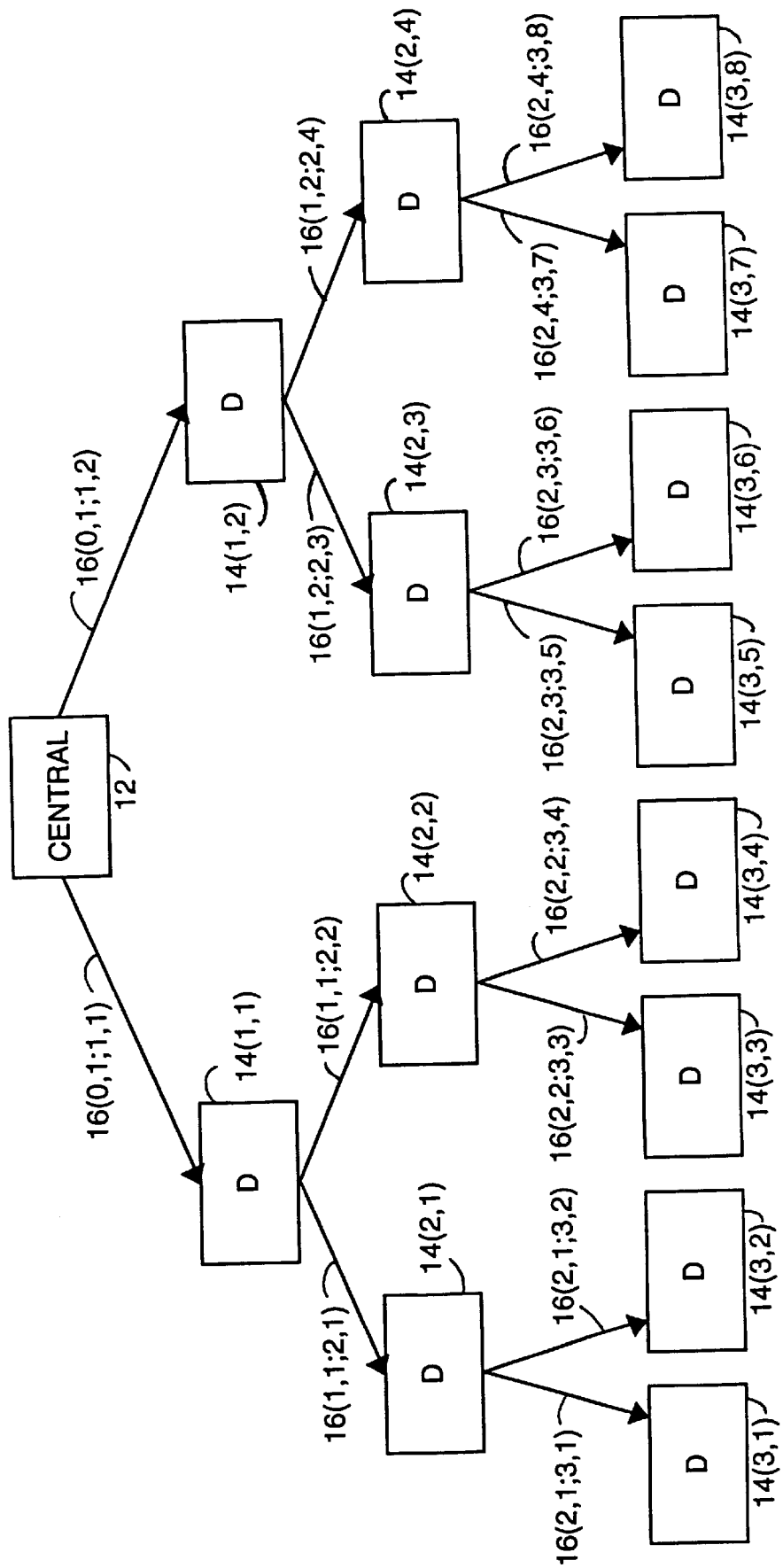
FIG. 3 shows a topologically equivalent arrangement of the configuration of FIG. 2 demonstrating the top-down tree structure resulting from the invention.

The nature of the interconnection configuration applied in FIG. 2 may be more readily appreciated by reference to FIG. 3. As will be appreciated upon comparison of FIG. 3 with FIG. 2, the structures shown in the two drawing figures are topologically equivalent to one another.

That is, each station shown in FIG. 2 is shown in FIG. 3, and each station shown in FIG. 3 is shown in FIG. 2. Moreover, each connection between any two stations in FIG. 2 is also shown in FIG. 3, and vice versa. Thus, there is no structural component or interconnection of FIG. 3 which is in any way different from FIG. 2. The only difference between the figures relates to a repositioning of the elements of FIG. 2, for ease of appreciation and understanding of the inventive configuration used therein.

Thus, consideration of the rearrangement shown in FIG. 3 demonstrates that, by properly partitioning (grouping) and interconnecting the destination stations of FIG. 2, it is possible to obtain a top-down tree structure for communicating between the central station 12 and the plurality of destination stations 14, where various ones of the destination stations assist the central station by participating in the communication.

Indeed, the configuration illustrated in FIG. 3 is a tree having four tree levels, in which central station 12 is a source node at a $0^{th}$ level of the tree and transfers the updating information only to nodes 14(1, 1) and 14(1, 2) at a first level of the tree. The nodes at the first level of the tree are thus updated directly by the central station. The nodes at the first level of the tree themselves update the nodes at a second level of the tree. The nodes at the second level are thus updated by the nodes at the first level and, in turn, update nodes at a third level of the tree, and so on.

In general, the tree has L (in this instance, four) tree levels where nodes at an $n^{th}$ level are updated by nodes at an $n-1^{th}$ level and in turn update nodes at an $n+1^{th}$ level, for values of n between 1 and L−1. Moreover, it will be seen that when the arrangement of FIG. 2 is viewed in the manner illustrated at FIG. 3, each node updates B nodes, where B is an integer less than N (i.e., less than the total number of nodes in the communication network) thus reducing the number of updates implemented by the central station. In such a situation, wherein each transferor calls B transferees, $B^K$ systems will be updated at the $K^{th}$ level of the tree. Of course, the number of transferees updated by each transferor, as well as the number of levels in the tree, need not be the numbers (2 and 4, respectively) illustrated in the arrangement of FIG. 3, and may be any convenient numbers chosen in accordance with any particular criteria.

However, for any value of B and N, it will be appreciated that the configuration of FIG. 3 results in faster completion of the update process, as well as in a reduction in the facilities required of the central station. In the arrangement of FIGS. 2 and 3, for example, central station 12 is required to implement only two updating operations (of destination stations 14(1, 1) and 14(1, 2) instead of fourteen updating operations, as required by the interconnection illustrated at FIG. 1. Further, in the embodiments of FIGS. 2 and 3, all destination stations have been updated after the time necessary to implement a number of update operations which is proportional to the number of levels (L−1, or 3) following the central station in the tree structure, rather than to the number of destination stations (14).

When presented mathematically, suppose the unit of time required to update each computer is t. At the start, there is only one node capable of updating the others (The central node). It takes t seconds for the central node to update another node. At the end of t seconds, there will be 2 computers available to update others. The two nodes capable of updating will update two more nodes. The two nodes capable of updating will update two more nodes after the second t seconds (total of 2×t seconds). At the end of 2×t seconds, four nodes are updated. Assuming the updates continue to be successful and the nodes continue to update other nodes without interruptions to do other tasks, after each t seconds time interval, the number of updated stations double. Therefore, after n×t seconds (at the end of the $n^{th}$ time interval), the total number of stations updated is equal to $2.^7$ N−$2^7$=>$\log_2$N−n. Hence, the number of time intervals to update N nodes is $\log_2$N=lg ½×lgN=1.44×lg N. For example, it if takes 30 seconds to update each node, the total time required to update 100,000 nodes by the means of this invention is 1.44×0.5×log (100,000) approximately 9 minutes. If the central station contacts each node, the total time will be 0.5×100,000=50,000 minutes=833 hours=35 days. As this number is approximately one less than the log of the total number of nodes in the tree, a good approximation of the number of updating operations which need to be performed is $\log_B$N−1=$\log_B$N, as N becomes large. Thus, configuring the communication links in accordance with the invention reduces the number of updating operations to approximately $\log_B$N, which is only a fraction ($\log_B$N)/N of the number required to update the N destination stations in accordance with the prior art.

Thus, by properly arranging the communication links for communication among various destination stations in a communication network as illustrated at FIGS. 2 and 3, a substantial savings is achieved both in the number of operations (and time) necessary to update all destination stations at the various customer sites and in the required capacity of the central station to implement such updates.

Figure 4:
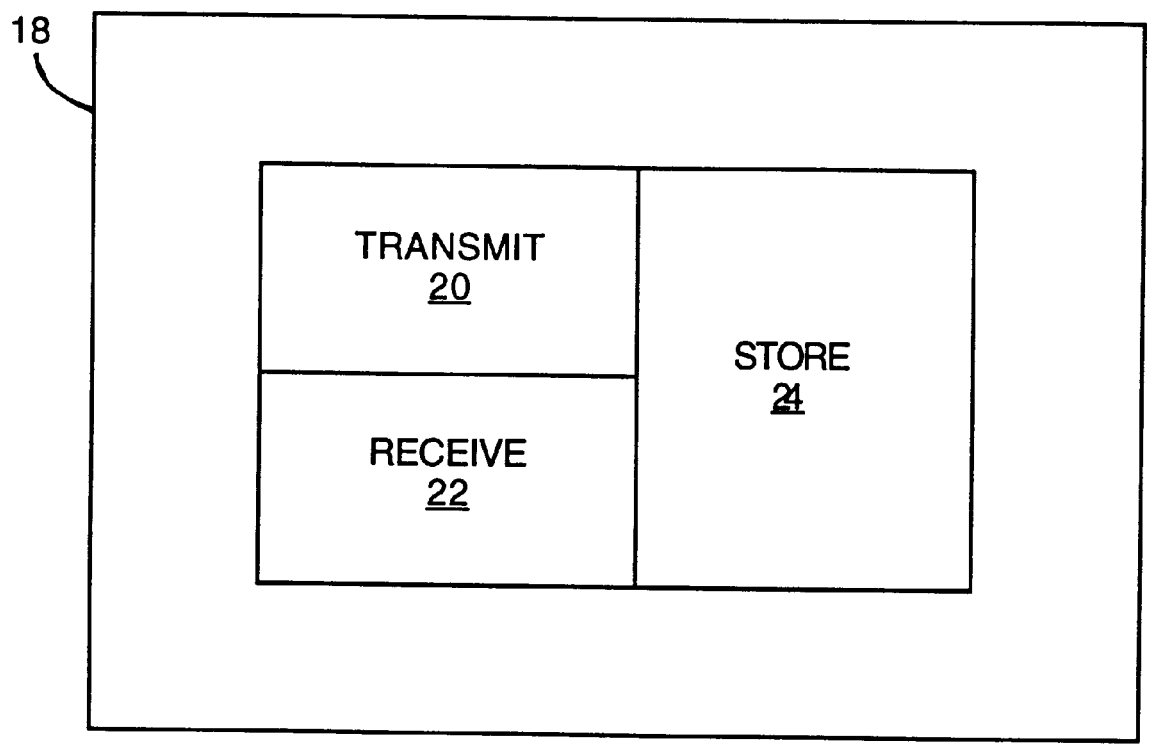
FIG. 4 shows a typical destination station used in FIGS. 1–3.

FIG. 4 shows a schematic representation of the type of communication station used in the communication network of FIGS. 2 and 3. As shown therein, a destination station 14 is located at a customer site 18 which, as above described, may include postage meters, shipping systems, or the like. The destination station 14 includes a transmitter portion 20, a receiver portion 22 and a storage 24. Each of the transmitter, receiver and storage operates in accordance with control by a computer or microprocessor (not shown) at the customer station or at the central station.

In operation, in order to transfer particular (e.g., update) information to the destination stations, a central transfer facility (the primary transferor computer at the top node of the tree structure of FIG. 3) calls a remote computer (transferee) and transfers the update information thereto via a designated communication link.

This may be implemented in several ways, two of which are described as follows. In a simple manner, using arbitrary or random criteria, or in consideration of specific factors, the computer at central station 12 may group the destination stations. Thus, B of the destination stations are placed in a first group having B stations, $B^2$ stations are placed in a second group, $B^3$ stations are placed in a third group, etc. Communication links are designated, to identify connections from a station (i,j) to a station (k,l). This designation may identify a telephone number of a transferee destination station (k,l) which is to be connected by a transferor destination (i,j), and thus may identify a telephone number of the transferor station (i,j) to which the communication link data is to be sent. Such a grouping and designation of communication links thus fully describes a top-down tree structure as illustrated in FIG. 3 and is thus referred to as the tree structure data.

It should be appreciated, however, that it is also possible that the tree structure data are generated elsewhere and provided for storage in, and control of, the computer at the central station 12.

In order to transfer the update information, the central station may consult the top down tree structure data stored therein. Together with the update information, the central station may then transfer tree structure data to each of the two stations 14(1,1) and 14(1,2). Either the entirety of the tree structure data may be transferred or, with minimal processing, only that half of the tree structure data relevant to station 14(1,1) may be transferred thereto, and only that half of the tree structure data relevant to station 14(1,2) may be transferred to that station.

In either case, stations 14(1,1) and 14(1,2) then act as transferors and transfer the update information, along with either the entire tree structure data received thereby or along with only a relevant half of that tree structure data, to each of two stations: 14(2,1), 14(2,2) and 14(2,3), 14(2,4), respectively. Where B is a number different from 2, such as 3 for example, the central station may transfer only the relevant third of the tree structure data to each of three transferee stations which, in turn, transfer only a relevant third of that data to transferee stations at the next tree level.

However, rather than transferring tree structure data to the various destination stations for each update operation, it is also possible to establish the communication links and tree configuration separately from an updating operation, and to provide and store the relevant tree structure data in storage 24 of each destination station 14 by implementing a separate operation, thus reducing the time necessary to implement an update by eliminating the necessity to transfer tree structure data.

Such an approach establishes a (semi) permanent configuration for the communication network, which thus requires updating when customer sites are added to, or deleted from, the network.

As another feature of the invention, success or failure of each transfer is reported back from a transferee to its transferor, using the communication link on which it received its transfer information.

When a transferor computer receives a failure message from a remote transferee, the transferor is programmed to send the failure message back to its own (preceding) transferor in the tree. Thus, the preceding transferor can report the failure of its transferee to yet another preceding level of the tree, until the central station 12 at the top node of the tree structure is informed of a failure of information transfer and of the transfer route along which the failure occurred.

Upon receipt by a transferor computer of a failure message from a transferee thereof, the transferor is programmed to reschedule the call. After a predetermined number of rescheduled attempts, if a failure still cannot be corrected the failure is identified as a final failure. Moreover, since the transferee also acts as a transferor, an entire subtree of the tree structure, i.e., a transfer tree (or directory) of destination stations is easily identified by the transferor. Thus, when a final failure occurs, the transferor also schedules calls to all subsequent transferees of the failed transferee. Such scheduling of calls to update the various destination stations in the transfer tree may be decided upon, and implemented, at the top node.

Moreover, after the top node of the tree structure receives a series of success and failure messages, corrective action may be taken, such as generating a service request and using alternate means to transmit the information to the failed transferee and to all transferees thereof, such as the use of mail.

The foregoing description of the preferred embodiment of the invention has been presented for purposes of illustration and description. It is not intended to be exhaustive or to limit the invention to the precise forms disclosed, since many modifications or variations thereof are possible in light of the above teaching. For example, as hereinabove noted, the tree information may be stored at each customer station, so that the central station may simply transmit the update information to its subsidiary devices, along with an initiate transfer command to cause the transferee subsidiary devices to transfer the update information to their own subsidiaries in the same manner. Further, although modems are described for transfer of information via telephone lines, coders may be used for transfer of the information using ISDN lines. As other alternatives, radio frequency microwave, satellite transmission, or any other method or means of information transmission may be used in a system utilizing the inventive concept.

All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. In a network of customer stations, including a computer controlled service center having apparatus for transmitting a set of data from the service center to a plurality of N customer stations where N is an integer, wherein each customer station of the network includes at least a receiver, a transmitter, and a storage, the improvement comprising:

(a) configuring means for establishing a tree structure including groups of customer stations and for establishing communication links thereamong, the tree structure including L tree levels where L is an integer, (b) customer stations at each level n being connected in accordance with said tree structure to receive data signals from at least one customer station at a preceding level n−1 of the tree structure via respectively corresponding ones of said communication links and to transfer data signals to a set of B respective customer stations at a subsequent level n+1 of the tree structure via respectively corresponding ones of said communication links, where n=1, 2, . . . L−1, a level 0 is defined as a level including said service center, and B is an integer less than N;

(c) a transmitter of each customer station at level n of the tree structure being connected to receivers of a respective set of B customer stations at level n+1 of the tree structure for transmitting the set of data to receivers thereof;

(d) a receiver of each customer station at level n of the tree structure being connected to a transmitter of a respective customer station at level n−1 of the tree structure for receiving the set of data therefrom;

(i) said service center connected to a set of B customer stations at level 1 of the tree structure for transmitting the set of data to receivers thereof via respectively corresponding ones of said communication links, (ii) whereby the set of data is transmitted to said plurality of N customer stations with reduced involvement of said service center, which transmits the set of data only to said set of B customer stations at said level 1 of the tree structure and (e) confirming means for transmitting confirmation signals whereby said service center receives a confirmation signal identifying each of said customer stations failing to receive the set of data transmitted thereto.

2. Computer controlled apparatus for transmitting a set of data from a source node to a plurality of N destination nodes of a communication network where N is an integer, wherein each node of the communication network includes at least a receiver, a transmitter, and a storage, comprising:

(a) configuring means for establishing a tree structure configuration of said communication network including L tree levels where L is an integer, (b) nodes at each level n being connected in accordance with said configuring means to receive data signals from at least one node at a preceding level n−1 of the tree structure configuration and to transfer data signals to a set of B respective nodes at a subsequent level n+1 of the tree structure, where n=1, 2, . . . L−1, a level 0 is defined as a level including said source node, and B is an integer less than N;

(c) a transmitter of each node at level n being connected to receivers of a respective set of B nodes at level n+1 of the tree structure configuration of the communication network established by said configuring means for transmitting the set of data to receivers thereof;

(d) a receiver of each node at level n being connected to a transmitter of a respective node at level n−1 of the tree structure configuration of the communication network established by said configuring means for receiving the set of data therefrom;

(i) said source node connected to a set of B nodes at level 1 of the tree structure configuration for transmitting the set of data to receivers thereof, (ii) whereby the set of data is transmitted to said plurality of N destination nodes with reduced involvement of said source node, which transmits the set of data only to said set of B nodes at said level 1; and (e) confirming means for transmitting confirmation signals, including:

(i) a connection from transmitters of nodes at the final level L of the tree structure configuration to receivers of the respective nodes connected thereto at immediately preceding level L−1;

(ii) for n=1, 2, . . . L−1, receivers of each node at level n of said tree structure connected for receiving confirmation signals from the transmitters of B nodes at level n+1 of the tree structure to which said each node had transmitted the set of data; and (iii) transmitters of each said node at said level n connected for transmitting a further confirmation signal, including confirmation data from each of said B nodes at said level n+1, to the respective node transmitting the set of data thereto from level n−1; whereby said source node receives a confirmation signal identifying nodes failing to receive the set of data transmitted thereto.

3. Apparatus according to claim 2, wherein said configuring means comprises programmed computer means transmitting configuration data to said N nodes of the communication network for establishing said L tree levels, for establishing respective position identifications of said N nodes in said L levels, and for establishing connections of nodes identified as positioned in level n to respective nodes in levels n−1 and n+1, wherein each node comprises configuration storage means for storing said configuration data.

4. Apparatus according to claim 2, wherein said configuring means comprises configuration storage means in each node for storing tree structure configuration data identifying a respective position of said each node as being in a particular one of said L levels, and for storing connection information to respective nodes identified as positioned in levels n−1 and n+1.

5. A method for transmitting a set of data from a transferor source node to a plurality of N destination transferee nodes of a communication network, where N is an integer, comprising the steps of:

(a) transmitting the set of data from the transferor node to a set of B intermediate transferee nodes at a particular level n of a tree structure configuration of the communication network, where n is an integer, said set of B intermediate transferee nodes is a subset of said set of N destination transferee nodes and B is an integer smaller than N;

(b) each of said intermediate transferee nodes at said particular level of said tree structure thereafter operating as a subsidiary transferor node and transferring the set of data to an additional subset of B intermediate transferee nodes at a next level of the tree structure configuration of the communication network;

(c) iteratively repeating said step of transferring the set of data from intermediate transferee nodes operating as subsidiary transferor nodes to additional sets of intermediate transferee nodes at a next level of the tree structure configuration so that at a $K^{th}$ iteration intermediate transferee nodes at a present level n+K of the tree structure configuration transfer the set of data to sets of nodes at a next level n+K+1 of the tree structure configuration where K is an iteration index successively taking values K=1, 2, 3, . . . until the present level of the tree structure configuration of the communication network is a final level P of the tree structure configuration, where P is an integer;

(d) whereby the set of data is transmitted to said plurality of N remote destination transferee nodes with reduced involvement of said transferor node, which transmits the set of data only to said single subset of B intermediate transferee nodes at said step 6(a);

(e) transmitting confirmation signals by implementing the steps of:
  (i) transmitting a confirmation signal from a transferee node at the final level P of the tree structure configuration to the intermediate transferor node therefor at a particular immediately preceding level P−1; and wherein each of said intermediate transferor nodes at said particular immediately preceding level of said tree structure performing the steps of:
  (ii) receiving confirmation signals from the subset of B transferee nodes at said next level of the tree structure to which it had transmitted the set of data;
  (iii) generating a further confirmation signal including confirmation data from each of said subset of B transferee nodes at said next level; and
  (iv) transmitting said further confirmation signal to the transferor node therefor at the level preceding thereof; and (f) iteratively repeating said steps of receiving confirmation signals, generating a further confirmation signal and transmitting said further confirmation signal to next preceding level of the tree structure configuration so that at an $R^{th}$ iteration intermediate transferee nodes at a level P−R of the tree structure configuration transfer the confirmation signals to nodes at a preceding level P−R−1 of the tree structure configuration where R is an iteration index successively taking values R=1, 2, 3, . . . until the next preceding level of the tree structure configuration of the communication network includes the transferor source node.

6. A method for transmitting the set of data in accordance with claim 5, comprising the further step of establishing said tree structure configuration of the communication network by transmitting tree structure information to said subset of B intermediate transferee nodes of said set of N destination transferee nodes.

7. A method for transmitting the set of data in accordance with claim 5, wherein said step 6(a) of transmitting the set of data comprises transmitting first update information to second update information stored in said N nodes.

8. A method for transmitting the set of data in accordance with claim 5, wherein said step 6(a) of transmitting the set of data further comprises transmitting tree structure information to said subset of B intermediate transferee nodes of said set of N destination transferee nodes and said step 6(b) further comprises the step of transferring the tree structure information from said subset of B intermediate transferee nodes at said particular level of the tree structure configuration of the communication network to an additional subset of B intermediate transferee nodes at said next level of the tree structure configuration of the communication network.

* * * * *